Feb. 17, 1931.    M. F. BATES    1,793,433
AUTOMATIC PILOT
Original Filed Dec. 31, 1927    3 Sheets-Sheet 1
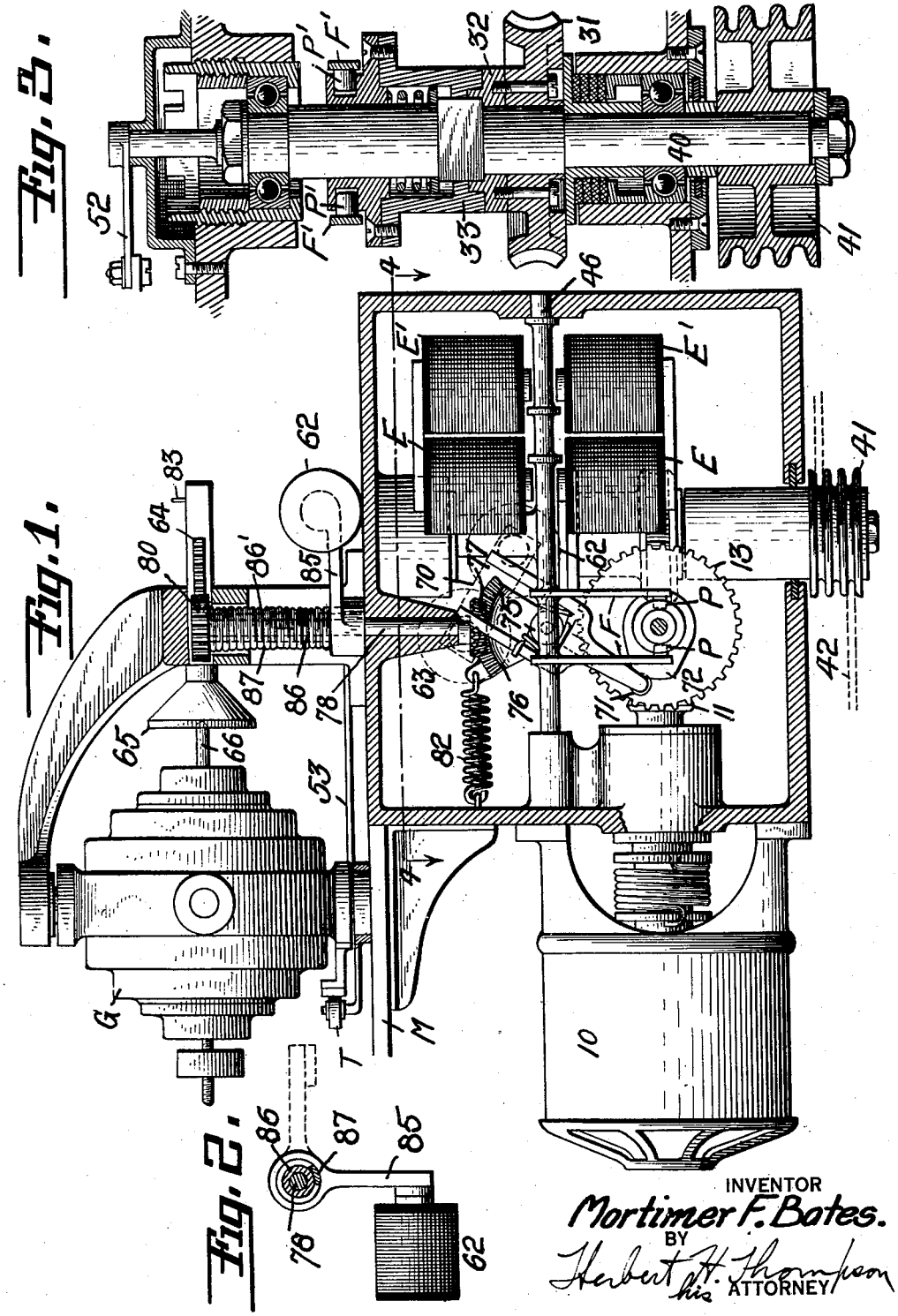

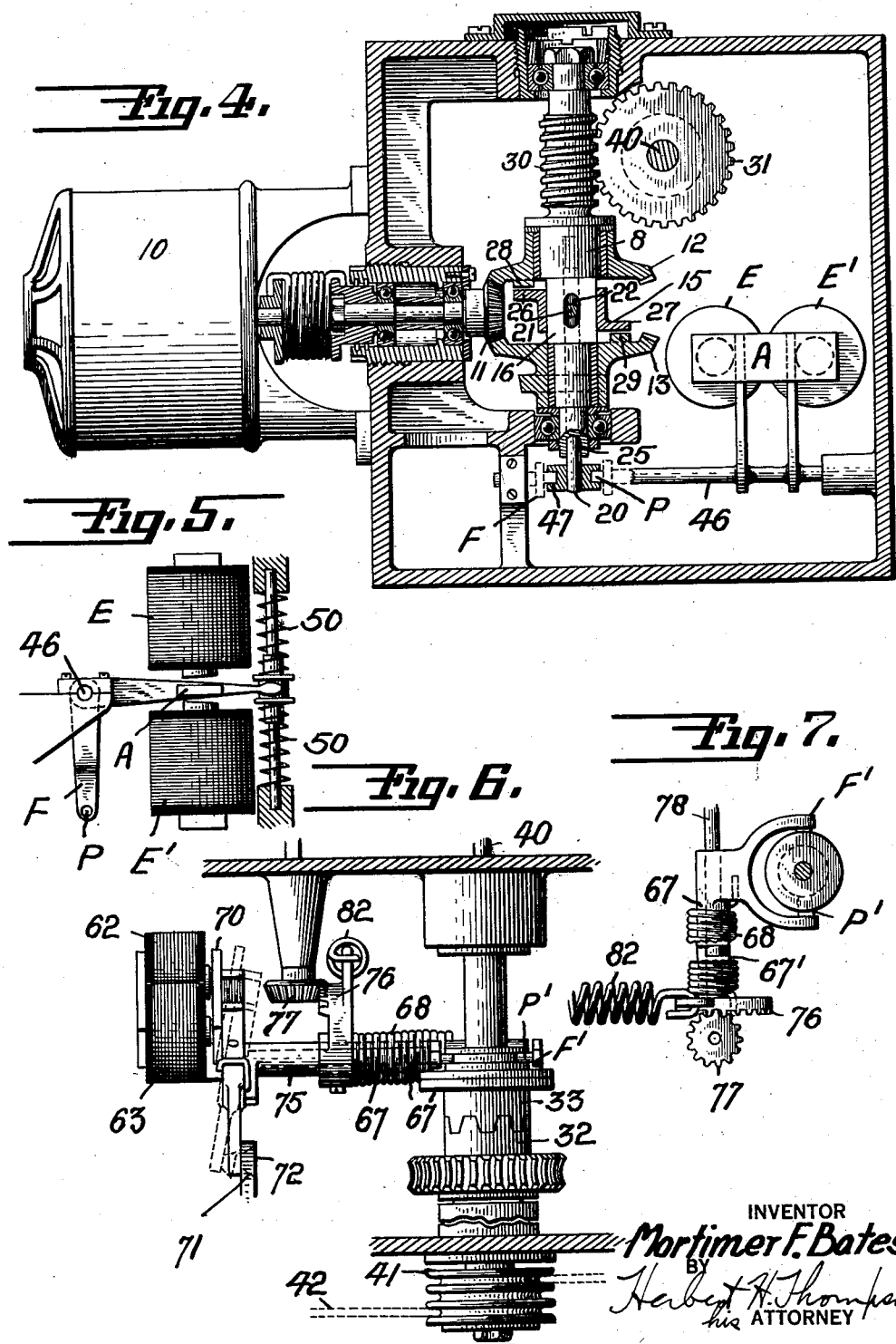

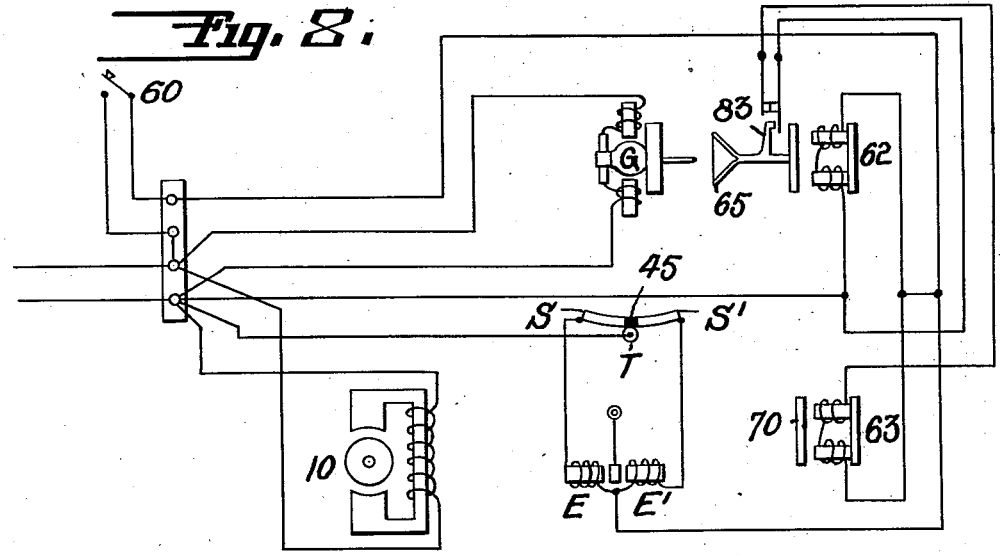
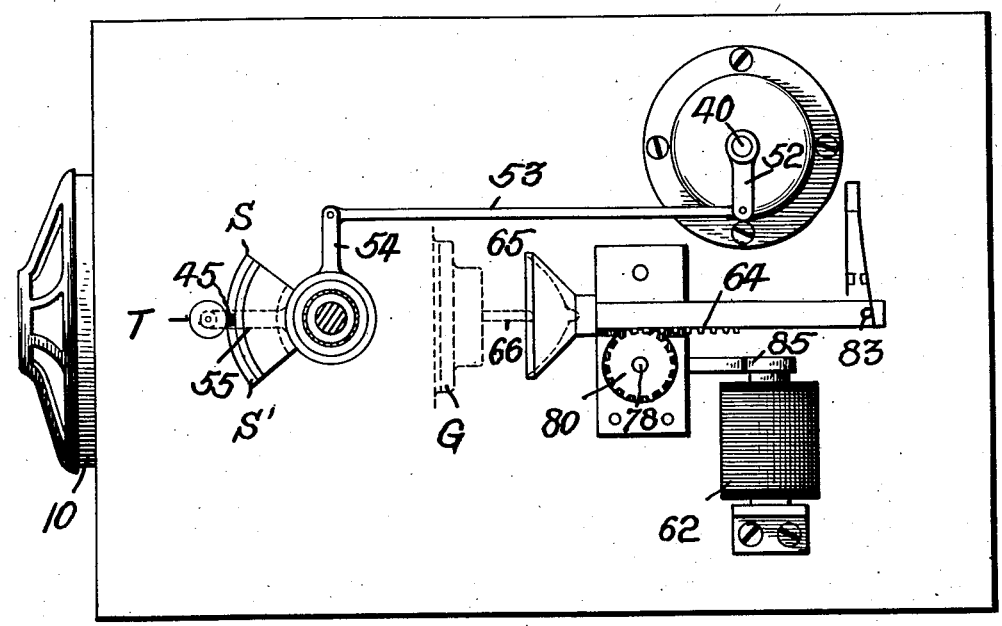

Patented Feb. 17, 1931

1,793,433

UNITED STATES PATENT OFFICE

MORTIMER F. BATES, OF BROOKLYN, NEW YORK, ASSIGNOR, BY MESNE ASSIGNMENTS, TO SPERRY GYROSCOPE COMPANY, INC., A CORPORATION OF NEW YORK

AUTOMATIC PILOT

Application filed December 31, 1927, Serial No. 243,786. Renewed October 22, 1929.

This invention relates to airplane gyro rudder pilots, that is automatic steering mechanisms, and comprises essentially means for detecting deviation from course, such as an azimuth gyro, and servo-motor means under the control of the means for detecting deviation for operating the rudder. The said servo-motor mechanism is usually positioned at considerable distance from the pilot and closely adjacent to the rudder to be actuated. Some form of distant control means is, therefore, desirable to enable the pilot to control the operation of the automatic steering mechanism at will. It is the principal object of my invention, therefore, to provide simple means, such as an ordinary electric switch, the operation of which will render the automatic steering device effective to maintain the craft on its course, or ineffective and mechanically free when hand steering is desired.

Another object of my invention is the provision of a simple control means, as described above, for rendering the automatic pilot effective or ineffective, which is so designed that upon failure of the supply current of said automatic steering equipment, said automatic steering device will be immediately and automatically rendered ineffective and mechanically free, without thought or action on the part of the pilot other than placing his feet on the rudder bar.

It is a further object of my invention to provide novel automatic steering equipment which is positive and smooth in its operation, simple and compact in construction, with few parts to get out of order.

Further objects and advantages of this invention will be pointed out in detail in the following description thereof.

In the accompanying drawings

Fig. 1 is a front elevation, partly sectioned vertically, of an assembly view of one form of my invention.

Fig. 2 is a detail of an electro-magnetic circuit-closing mechanism.

Fig. 3 is a longitudinal section through the final driving shaft and clutch mechanism for actuating the rudder-operating cables.

Fig. 4 is a horizontal sectional view taken on the line 4—4 of Fig. 1.

Fig. 5 is a detail of an electro-magnetic means for actuating the gear clutch shown in Fig. 4.

Fig. 6 is an enlarged detail view of means for rendering the driving clutch of Figs. 1 and 3 effective.

Fig. 7 is a view of a portion of the clutch actuating means shown in Fig. 6 but viewed at right angles thereto.

Fig. 8 is a wiring diagram of the apparatus.

Fig. 9 is a plan view largely diagrammatic and with parts broken away of the Fig. 1 device.

Referring to the drawings, the operation of my automatic steering device may be briefly described as follows: A continuously operating motor 10 drives a bevel gear 11 (see Fig. 4) meshing with two bevel gears 12 and 13 which it drives in opposite directions. Said gears are mounted loosely upon a shaft 8 and when one or the other of said gears is connected to shaft 8, said shaft is driven in one direction or the other. For causing gear 12 or gear 13 selectively to be locked to shaft 8 to drive the same, I may provide a driving dog 15 mounted on a squared portion 16 of shaft 8. Said dog 15 is fixedly carried by a shaft 20 by means of a pin 21 extending through a longitudinal slot 22 in the said squared portion 16 of shaft 8, so that said dog may be operated axially of shaft 8 by operating shaft 20 axially. For this purpose shaft 20 extends into a bore 25 within shaft 8 to such an extent as to permit axial movement of dog 15 to cause said dog to engage gear 12 or gear 13. Said engagement is effected by means of projections 26 and 27 on said dog engaging between cooperative projections 28 and 29 carried by the gears 12 and 13 respectively. It will now be seen that if shaft 20 is moved further into shaft 8, gear 12 will be locked to said shaft through dog 15, while if shaft 20 is drawn outwardly from shaft 8 a given distance, dog 15 will engage gear 13 to connect gear 13 to shaft 8, and thus drive said shaft in the reverse direction.

Shaft 8 carries at its upper end gearing such as worm 30 meshing with worm-wheel 31, said worm-wheel 31 having fixed thereto one clutch member 32, the other member 33 of said clutch being keyed to driving shaft 40 which carries at one end pulley 41 over which operate the rudder actuating cables 42. The worm 31 and clutch member 32 are loose upon shaft 40 so that it is only when clutch member 33, which is keyed to shaft 40 is slid into engagement with clutch member 32, that shaft 40 is driven. Shaft 40 will be driven in one direction or the other depending upon the direction of rotation of wormwheel 31, which, as hereinbefore pointed out, depends for its direction of rotation upon the position of shaft 20 which will cause either gear 12 or gear 13 to be keyed to shaft 8.

The direction of operation of the rudder must be controlled by the course-determining means. In this instance, said means is an azimuth gyro G, designed to maintain its position in azimuth, and has fixed thereto contact segment S—S' (see Fig. 8) separated by an insulated segment 45 and having cooperating therewith a trolley T carried by the fixed frame M. When the craft is on its course, trolley T rests upon insulation segment 45, but upon deviation from course contact segments S—S' remain fixed in azimuth, while trolley T moves with the craft and hence into engagement with contact S or S' depending upon the direction of deviation, to energize one or the other of sets of electro-magnets E—E' to attract an armature A in one direction or the other. Said armature forms one arm of a bell crank pivoted upon a shaft 46 (see Fig. 1), said shaft carrying the fork F carrying the pins P engaging in a circumferential slot formed in a collar 47 carried upon the outer end of shaft 20. Said armature A is normally held in centralized position by centralizing springs 50 and when attracted in one direction or the other by electro-magnet E or electro-magnet E' it will shift shaft 20 axially in one direction or the other to cause engagement of gear 12 or gear 13 and thus operate the rudder in the proper direction to restore the craft to its course. Shaft 40 may be provided with a follow-up linkage 52 to 55 (see Fig. 9) to the trolley T in the usual manner.

The apparatus as shown has all of the parts in the positions corresponding to the effective condition of the automatic steering equipment, that is to say, magnet 62 is energized to release gyro G from cage 65 so that the azimuth gyro G is free to maintain its position in azimuth, the clutch 32—33 is effective, and the circuit through magnets E—E' is effective to actuate shaft 20 upon deviation of the craft from course. I provide means in the form of a single switch 60, the actuation of which to open or closed position is all that is necessary to render the automatic steering equipment effective or ineffective to operate. In order to place the mechanism in effective condition, I close switch 60, which, as will be seen by referring to Fig. 7, energizes electro-magnets 62 and 63. The energization of magnets 63 causes them to attract an armature 70 in the form of a pivoted lever carrying at its opposite end a roller 71 adapted to engage a cam 72 driven through suitable gearing from the motor 10. Normally roller 71 is out of the plane of said cam 72, but when magnets 63 are energized to attract their armature 70, roller 71 is brought into the plane of said cam. Hence, upon further rotation of said cam the lever carrying roller 71 will be rocked about its shaft 75 (see also Fig. 6) which will rock the fork F' carrying pins P' to cause clutch part 33 to engage clutch part 32. The drive from shaft 75 to the fork F' is through a two-part shaft having a certain amount of play between the parts 67, 67' which are connected by a spring 68. If the clutch parts 32 and 33 are not in a position to mesh, part 67 may continue its movement and the tension of spring 68 will be increased to assist the clutching action.

At the same time rocking of said shaft 75 rotates a segmental gear 76 which meshes with a gear 77 at the lower end of a shaft 78. Said shaft may be of two-part construction with slight play between the parts, said parts interconnected by a spring 79 to provide a resilient drive. Thus, it will be seen that rocking of shaft 75 not only effects engagement of clutch 32—33 but rotates gear 80 at the upper end of shaft 78 to rotate arm 85 into engagement with the poles of electro-magnet 62 which then attracts and holds said arm. Arm 85 is connected to the rack 64 through the two-part shaft 86, 86' and the spring 87 so that the gyro is uncaged when the arm 85 is in engagement with magnet 62. The two-part shaft 86, 86' has a certain amount of play between the parts so that if upon the return movement of the rack the cage should strike the gyro axle, the lower part 86 of the shaft would continue its return movement while the upper part 86' lagged behind. The lagging of the part 86' behind part 86 serves to increase the tension of the spring 87 which assists in returning the rack and cage quickly to unactuated position. Magnet 62, by holding rack 64 in energized position, also holds clutch 32—33 against the action of a restoring spring 82 which may be connected to gear segment 76 and tending to restore the parts to ineffective position. In its rearward movement rack 64 by means of a projection 83 carried thereby is adapted to trip the circuit through magnets 63 (see Fig. 8) and thus release armature 70 so that roller 71 again moves out of the plane of cam 72.

It will thus be observed that by merely operating switch 60 to close the circuit, magnets 63 are energized to permit roller 71 to engage cam 72 and thus actuates the parts to render clutch 32—33 effective and release gyro G from its cage 65. Also, by merely opening switch 60 or if the electric circuit through magnet 62 is in any manner broken, all of the parts will at once be returned to ineffective position by spring 82. It will be understood that magnet 62, when energized, is normally sufficient to hold arm 85 in contact with its poles against the restoring action of spring 82.

Another advantage of the construction described above becomes readily apparent. When the operator desires to change the course of the craft he need only open switch 60, whereupon the servo-motor is disconnected from the rudder, leaving the rudder mechanically free for actuation by the operator and at the same time the gyro is centralized with respect to the craft. As soon as the craft has been turned into the new course, releasing of the gyro (by closing switch 60) enables it to act at once through the servo-motor to maintain the craft on its new course, because the gyro has been held in centralized position while the craft turned into its new course. I make no claim herein, however, broadly to a system for changing course by caging and uncaging the gyroscope, since such a system is shown in the prior patent to Lawrence B. Sperry No. 1,757,096, dated May 6, 1930 for gyroscopic pilots for airplanes.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In combination with the rudder of a dirigible craft, electrically operated mechanism for automatically controlling said rudder, a remotely positioned switch for controlling the circuit through said mechanism, means whereby said mechanism is connected to said rudder when the circuit is closed, and means whereby said mechanism is disconnected from said rudder when the circuit is broken.

2. In combination with the rudder of a dirigible craft, mechanism adjacent said rudder and including a power means for automatically controlling said rudder, means normally maintaining said mechanism ineffective and said power means disconnected from said rudder, and means remote from said mechanism for rendering the same effective and for connecting said power means to said rudder.

3. In combination with the rudder of a dirigible craft, a gyroscope for normally governing said rudder, electrically operated mechanism, including a power means, for automatically controlling said rudder from said gyroscope, means whereby said mechanism is rendered effective and said power means is connected to said rudder when the circuit is closed, and means whereby said mechanism is rendered ineffective and said power means is disconnected from said rudder when the circuit is broken.

4. In combination with the rudder of a dirigible craft, a gyroscope for normally governing said rudder, electrically operated mechanism, including a power means, for automatically controlling said rudder and an electrically-operated lock for said gyroscope, means including a switch remotely positioned with respect to said mechanism whereby said mechanism is rendered effective and said power means is connected to said rudder when the circuit is closed, and means whereby said mechanism is rendered ineffective, said gyroscope locked and said power means is disconnected from said rudder when the circuit is broken.

5. In combination with the rudder of a dirigible craft, mechanism adjacent said rudder, said mechanism including a power means and selective means for connecting said power means to said rudder to drive the same in either of opposite directions, course responsive means for controlling said selective means, means whereby said power means is normally disconnected from said rudder and said mechanism and course responsive means are normally maintained ineffective, and means remote from said mechanism for connecting said power means to said rudder and rendering said mechanism and said course responsive means effective.

6. In combination with the rudder of a dirigible craft, electrically operated mechanism adjacent said rudder, said mechanism including a power means and selective means for connecting said power means to said rudder to drive the same in either of opposite directions, course responsive means for controlling said selective means, means whereby said power means is normally disconnected from said rudder and said mechanism and course responsive means are normally maintained ineffective, and means including a switch remote from said mechanism for connecting said power means to said rudder and rendering said mechanism and said course responsive means effective.

7. In combination with the rudder of a dirigible craft, mechanism adjacent said rudder, said mechanism including a power means, a clutch whereby said power means actuates said rudder, and a selective means interposed between said power means and said rudder for connecting said power means to said rudder to drive the same in either of opposite directions, course responsive means for controlling said selective means, means whereby said power means, clutch, and course responsive means are normally maintained in ineffective position, and means positioned remote from said mechanism whereby said power means, clutch, and course responsive means may be rendered effective.

8. In combination with the rudder of a dirigible craft, electrically operated mechanism adjacent said rudder, said mechanism including a power means, a clutch whereby said power means actuates said rudder, and a selective means interposed between said power means and said rudder for connecting said power means to said rudder to drive the same in either of opposite directions, course responsive means for controlling said selective means, means whereby said power means, clutch, and course responsive means are normally maintained in ineffective position, and means including a switch poistioned remote from said mechanism whereby said power means, clutch, and course responsive means may be rendered effective.

9. In combination with the rudder of a dirigible craft, electrically operated mechanism adjacent said rudder, said mechanism including a power means and selective means for connecting said power means to said rudder to drive the same in either of opposite directions, course responsive means for controlling said selective means, means whereby said power means is normally disconnected from said rudder and said mechanism and course responsive means are normally maintained ineffective, and means including an electrical circuit for connecting said power means to said rudder and rendering said mechanism and said course-responsive means effective when said circuit is closed and for disconnecting said power means and rendering said mechanism and said course-responsive means ineffective when said circuit is broken.

10. In combination with the rudder of a dirigible craft, mechanism adjacent said rudder including a servo-motor, a clutch for connecting said servo-motor to said rudder, a gyro for maintaining a course and controlling said servo-motor, said clutch and gyro being normally ineffective, and means including a cam, a member movable into the path of said cam, remotely-controlled means for moving said member into and out of engagement with said cam, and means whereby said member renders said clutch and said gyro effective when operated by said cam.

11. In combination with the rudder of a dirigible craft, mechanism adjacent said rudder including a servo-motor, a clutch for connecting said servo-motor to said rudder, a gyro for maintaining a course and controlling said servo-motor, said clutch and gyro being normally ineffective, and means including a cam, a member movable into the path of said cam, remotely-controlled means for moving said member into and out of engagement with said cam, means whereby said member renders said clutch and said gyro effective when operated by said cam, and means whereby said member is moved out of the path of said cam after said clutch and said gyro have been rendered effective.

12. In combination with the rudder of a dirigible craft, mechanism adjacent said rudder including a servo-motor, a clutch for connecting said servo-motor to said rudder, a gyro for maintaining a course and controlling said servo-motor, said clutch and gyro being normally ineffective, and means including a cam, a member movable into the path of said cam, a remotely-controlled electromagnet for moving said member into and out of engagement with said cam, means whereby said member renders said clutch and said gyro effective when operated by said cam, and means acting upon said electromagnet after said clutch and said gyro have been rendered effective for moving said member out of the path of said cam.

In testimony whereof I have affixed my signature.

MORTIMER F. BATES.